J. KRODER.
CURTAIN FIXTURE.
APPLICATION FILED MAY 31, 1911.
1,019,662.
Patented Mar. 5, 1912.
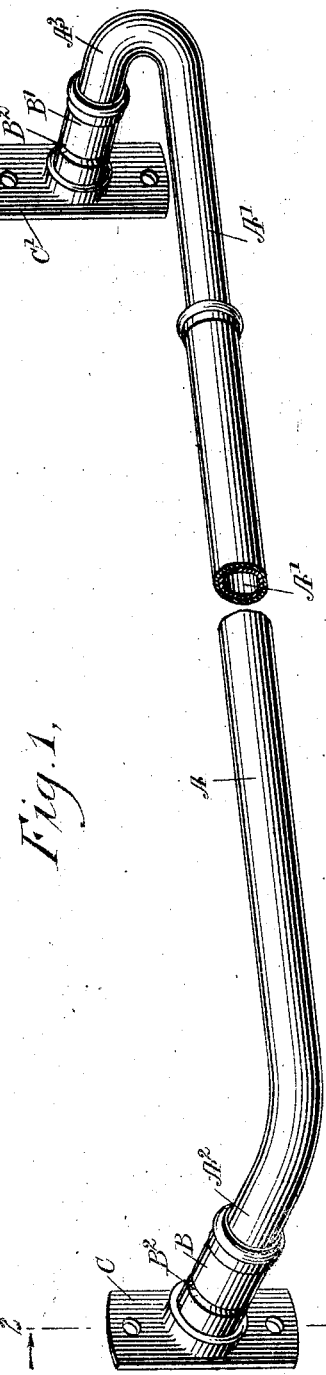
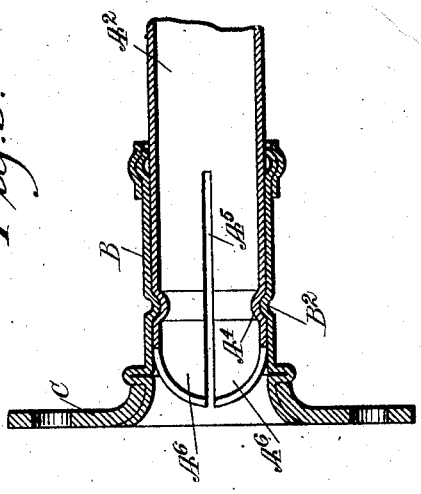
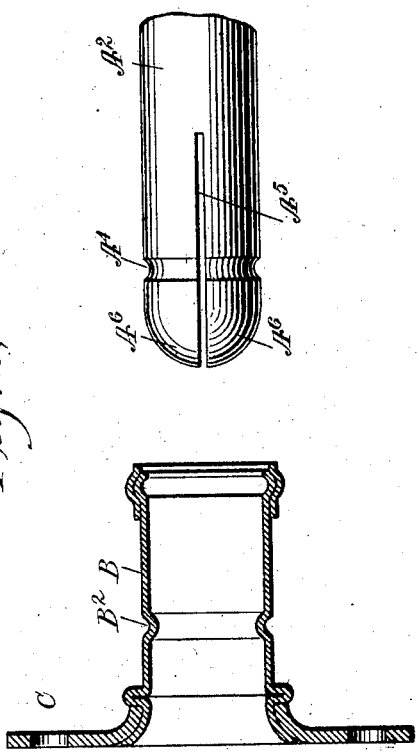
WITNESSES
Edward Thorpe
INVENTOR
John Kroder
BY
ATTORNEYS

UNITED STATES PATENT OFFICE.

JOHN KRODER, OF NEW YORK, N. Y.

CURTAIN-FIXTURE.

1,019,662. Specification of Letters Patent. Patented Mar. 5, 1912.

Application filed May 31, 1911. Serial No. 630,319.

*To all whom it may concern:*

Be it known that I, JOHN KRODER, a citizen of the United States, and a resident of the city of New York, borough of Manhattan, in the county and State of New York, have invented a new and Improved Curtain-Fixture, of which the following is a full, clear, and exact description.

The object of the invention is to provide a new and improved curtain fixture, more especially designed for use on vestibule doors, windows and the like, and arranged to permit of conveniently and securely fastening the curtain-holding rod in position on the supporting brackets, or to allow of removing the rod from the brackets, the rod being free of projections at the ends, thus permitting easy slipping of the pocket or hem of the curtain over either end onto the rod.

For the purpose mentioned each bracket is provided with a socket having an interior annular bead, and the end of the rod is yielding and provided with an exterior annular groove, so that when the angular end is passed into the socket it yields in passing the annular bead, and the latter finally snaps into the groove, thus securely locking the rod in position on the bracket.

A practical embodiment of the invention is represented in the accompanying drawings, forming a part of this specification, in which similar characters of reference indicate corresponding parts in all the views.

Figure 1 is a perspective view of the curtain fixture; Fig. 2 is an enlarged cross section of one of the brackets on the line 2—2 of Fig. 1, also showing the corresponding end of the rod in elevation and detached from the bracket; and Fig. 3 is a cross section of the same with the parts locked in position.

The curtain rod shown in Fig. 1 consists of tubular telescoping sections A, A' provided at their ends with angular arms $A^2$, $A^3$, adapted to engage the sockets B and B' attached to or formed on brackets C, C' attached to a door, window or other part on which the curtain fixture is to be used. Each of the sockets B and B' is provided with an inwardly-extending annular bead $B^2$, adapted to engage a correspondingly shaped annular groove $A^4$ formed exteriorly in the corresponding arm $A^2$ or $A^3$ of the rod sections A or A'. The ends of the arms $A^2$ and $A^3$ fit snugly into the sockets B, B' and in order to engage the annular head $B^2$ with the annular groove $A^4$, it is necessary that the terminal of each arm $A^2$, $A^3$ is split, as indicated at $A^5$, and the split members $A^6$ are turned inward toward each other to form a rounded off end for each arm, and the members $A^6$ of the rounded off end are free to yield on pushing the arm $A^2$ or $A^3$ into the socket B or B' so as to pass the annular bead $B^2$ and to cause the latter to snap into the corresponding annular groove $A^4$, thus securely locking the rod sections in place in the sockets B and B' of the brackets C, C'.

It will be noticed by reference to Figs. 2 and 3 that the arms $A^2$ and $A^3$ are free of external projections and consequently the pocket or hem of the curtain can be readily slipped over the end onto the rod sections, or removed therefrom without danger of tearing the pocket or hem. The sections A and A' forming the curtain rod are preferably of the split kind, but I do not limit myself to this particular construction.

It will be noticed that when it is desired to remove the curtain rod from the sockets, it is only necessary for the user to exert a straight outward pull on the arms $A^2$ and $A^3$ to disengage the beads $B^2$ from the annular grooves $A^4$, the split members $A^6$ yielding sufficiently in an inward direction to pass the annular bead $B^2$. By the arrangement described the sectional curtain rod can be conveniently placed and securely held in position in the sockets of the brackets or removed therefrom whenever it is desired to do so.

Having thus described my invention, I claim as new and desire to secure by Letters Patent:

1. A curtain fixture, comprising brackets each having a socket formed with an internal bead, and a rod formed of telescoping sections having their ends split and each formed with an external annular groove in the split end, the members of the split ends being bent inwardly toward each other to form rounded ends.

2. A curtain fixture, comprising a pair of brackets each having a socket provided with an interior annular bead, and a rod made in tubular telescoping sections terminating at their outer ends in angular arms, the terminals of which are split and the split members being bent inward toward each other to form a rounded off end, each arm having an exterior annular groove immediately in the rear of the rounded off end to be engaged by the said annular bead.

In testimony whereof I have signed my name to this specification in the presence of two subscribing witnesses.

JOHN KRODER.

Witnesses:
   THEO. G. HOSTER,
   JOHN P. DAVIS.